Sept. 23, 1952     C. B. BRIGHT     2,611,282
LINKAGE MEANS
Original Filed May 8, 1946     3 Sheets-Sheet 1
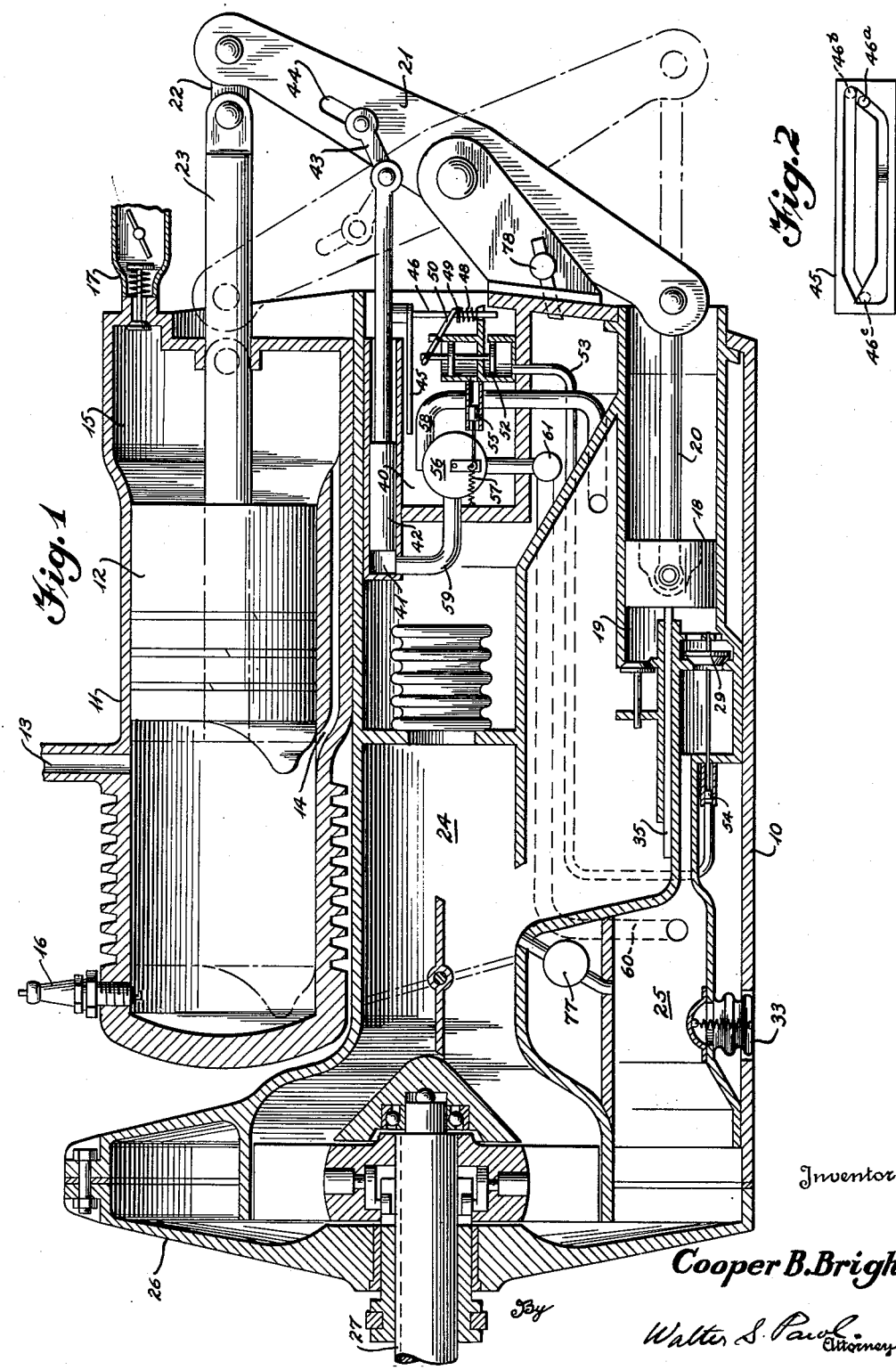
Inventor
Cooper B. Bright

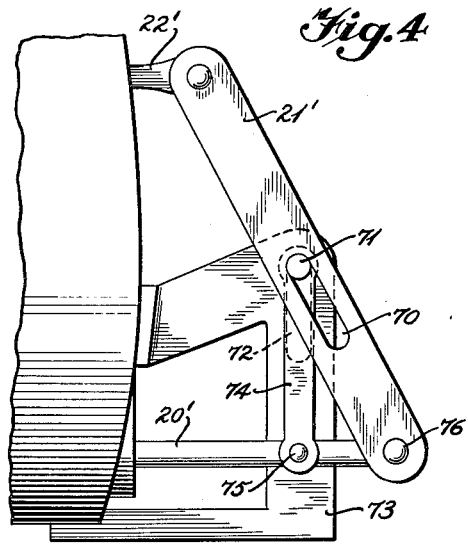
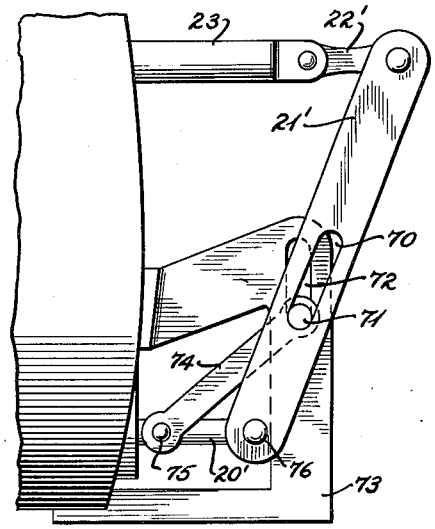
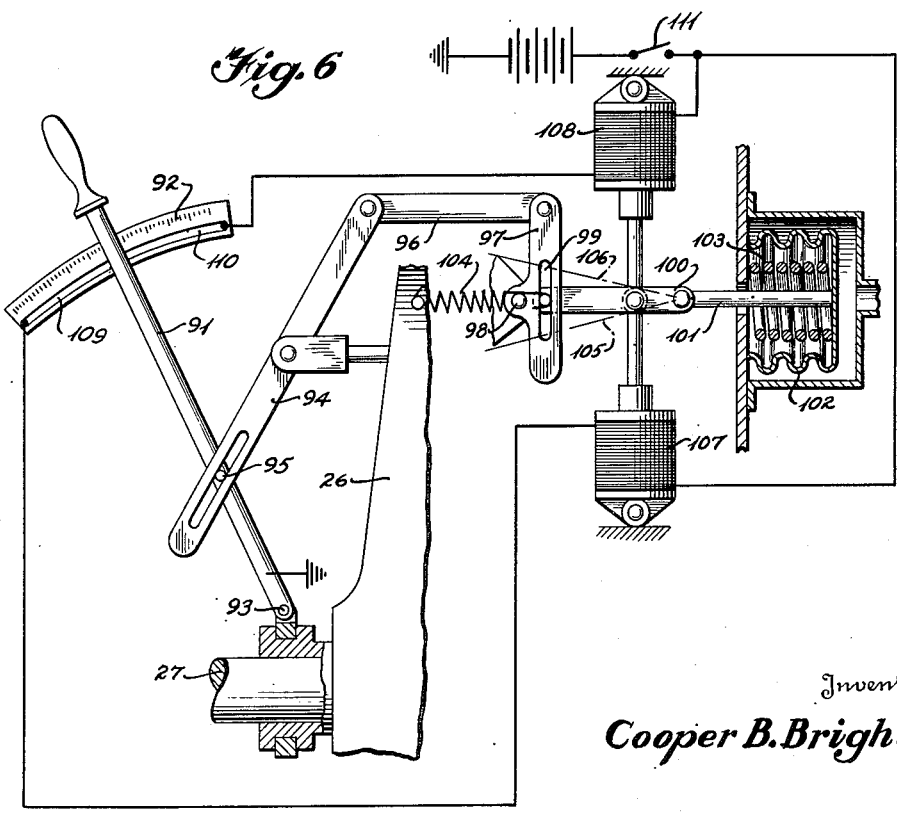

Sept. 23, 1952     C. B. BRIGHT     2,611,282
LINKAGE MEANS

Original Filed May 8, 1946     3 Sheets-Sheet 3

Inventor
Cooper B. Bright

By
Walter S. Pawl.
Attorneys

Patented Sept. 23, 1952

2,611,282

UNITED STATES PATENT OFFICE 2,611,282

LINKAGE MEANS

Cooper Buck Bright, United States Navy

Original application May 8, 1946, Serial No. 668,054. Divided and this application September 13, 1949, Serial No. 115,522

7 Claims. (Cl. 74—518)

(Granted under the act of March 3, 1883, as amended April 30, 1928; 370 O. G. 757)

This invention relates to a mechanical linkage mechanism. More specifically it is directed to a mechanical linkage having a slotted lever mounted on a shiftable pivot. A varying force and a substantially constant force may be applied to the lever to effect limited rotation of the lever in two directions depending on the effective moments of the forces.

The linkage is useful in power plants, for example, wherein shifting of the pivot during the normal operation will vary the mechanical relationship or advantage as the case may be according to requirements.

An object of the invention is to provide a linkage capable of transmitting varying force according to requirements.

Another object is to provide a closed linkage system having interrelated movements to maintain and/or vary the mechanical advantage of forces used to obtain movement in the linkage.

Another object is to provide a linkage useful in a power plant which power plant includes a motor for doing work at a desired rate coordinated with an engine in such a manner that the engine automatically supplies the motor with energy in accordance with the power requirements thereof.

Such a power plant is illustrated in Fig. 1 and is described in detail in application Serial No. 668,054 filed May 8, 1946, for Hydraulic Power Plant. The present application is a division of said application and of Serial No. 115,521 filed September 13, 1949 now Patent No. 2,584,981.

Further objects of invention other than those reicted above will be manifest from a consideration of the present description, claims and drawings in which:

Fig. 1 is a side view, partly in section, of a device embodying my invention;

Fig. 2 is a detail of Fig. 1;

Fig. 4 is an alternate construction of a portion of the bell crank linkage of Fig. 1, shown in one position;

Fig. 5 is a view similar to Fig. 4 showing the linkage in another position;

Fig. 6 is a view of an alternate turbine control mechanism;

Figure 7:
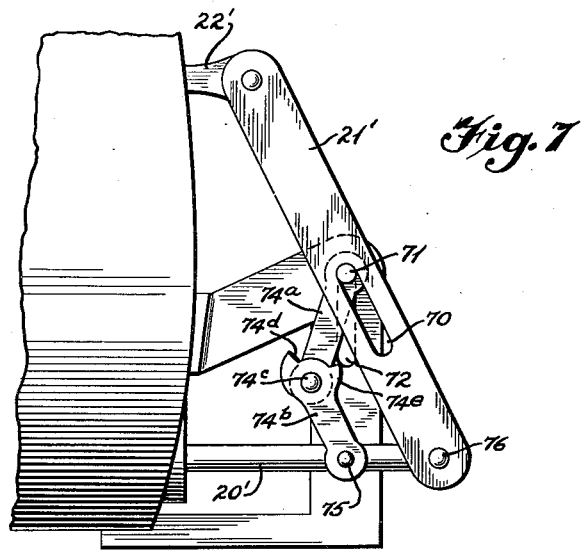
Fig. 7 is another alternate construction of a portion of the bell crank linkage of Fig. 1, shown in one position.

Referring to the drawings, a generally cylindrical support 10 for the various parts of the device is recessed at the top for the reception of an expandable gas prime mover, shown in the form of an air-cooled, two-cycle internal combustion engine cylinder 11 having a conventional piston 12, exhaust port 13, intake port 14, compression chamber 15, spark plug 16 and carbureter connection 17. To promote clearness in the drawings, the ignition system including batteries, coils, contact points, etc., are not shown, but it will be understood that any conventional system which would effect ignition at a predetermined point in the travel of piston 12 could be employed. The carburetor, also not shown, could be of any conventional type.

On the opposite side, and within the confines of support 10, is located a liquid pump illustrated as a piston 18 reciprocable in a cylinder 19. This piston is operably connected to piston 12 by means of connecting rod 20, bell crank 21, link 22 and piston rod 23.

Figure 3:
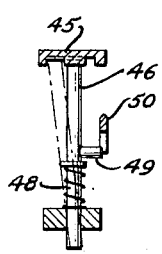
Fig. 3 is another detail of Fig. 1.

The operation of the power plant is such that under conditions where the power output of turbine 26 remains substantially constant, piston 12 will automatically operate on a conventional two-stroke otto cycle; however, under certain conditions, for example, when a misfire occurs by reason of faulty ignition, or where the mixture in the power cylinder has condensed because the system has been shut down, it becomes necessary to condition the engine for a subsequent power stroke. To this end, a self-starting device 40 is provided. This device comprises a cylinder 41 having a plunger 42 therein which is connected to bell crank 21 by link 43 and pin and slot connection 44. With the leverage relationships as shown, it would be necessary to construct plunger 42 with a greater cross-sectional area than plunger 35 since the former must overcome the resistance of the latter. Should a misfire occur and hence insufficient combustion pressure exist to return piston 12 on a power stroke, plunger 35 would move piston 12 beyond the normal point of travel where ignition would occur. This increase in travel would bring the pin in link 43 to the bottom of slot 44 and hence plunger 42 would be moved slightly to the left of its normally stationary position. Referring to Figs. 2 and 3, this movement displaces a cam 45, attached to plunger 42, to the left also, and as a result thereof, a pin 46 normally in engagement with the cam in the position as shown at 46a is moved laterally by the cam groove and into a deeper groove as shown at 46b under the urge of spring 48. Crosspin 49 attached to pin 46 thereupon forces lever 50 upwardly which in turn moves hydraulic actuators 51 and 52 downwardly. Hydraulic actuator 52 through the medium of the liquid in line 53 actuates plunger 54 opening valve 29 which permits liquid trapped in pump cylinder 19 to be returned to storage reservoir 25. Simultaneously with the foregoing, hydraulic actuator 51 through the medium of the liquid therebelow moves plunger 55 to the left, opening three-way valve 56 against the urge of compression spring 57. This permits flow of high pressure liquid into cylinder 41 by way of pipes 58 and 59 which moves plunger 42 to the right, carrying with it link 43 and bell crank 21 which in turn moves piston 12 to the position shown, thus recharging the cylinder 11. At this point plunger 35 again takes over to return piston 12 to the end of the compression stroke to resume normal operation. Also at this point, pin 46 is moved to the position shown at 46c releasing crosspin 49 from beneath lever 50. This allows spring 57 to urge three-way valve 56 to its normal position where the liquid in 41 is in communication with low pressure reservoir 25 by way of conduits 59 and 60. As piston 12 moves toward the end of the compression stroke, plunger 42 and cam 45 move therewith, and pin 46 is moved to its original position at 46a with crosspin 49 again repositioned below lever 50 to repeat the foregoing starting operation when it again becomes necessary. When piston 12 is normally functioning on its power and recharge strokes, link 43 merely swings back and forth with one end riding in pin and slot connection 44, plunger 42 remaining stationary. A check valve 61 may be provided in line 60 to prevent pressure fluctuations in reservoir 25 from effecting operation of plunger 42.

In some instances, it will be desirable to construct air tank 32 of relatively small size in which case it would not be capable of maintaining constant pressure on the liquid in reservoir 24, as previously explained. In this event, a control as shown in Fig. 6 may be provided to eliminate fluctuations in power of the turbine which would result from fluctuations of liquid pressure in reservoir 24. In this modification a lever 91 is provided, one end of which may be locked at various positions in notches along quadrant 92 but free to pivot thereabout. The other end of lever 91 is connected to collar 82 by yoke and pivot 93. A bell crank 94 has one end thereof connected to lever 91 by pivot 95 and the other end to a link 96. Link 96 is connected to one end of lever 97 which is pivoted at its center 98. A slot 99 is provided in lever 97 extending on both sides of the center thereof, and a link 100 has one end slidably engaged therein. The opposite end of this link is connected to rod 101 which is connected to bellows 102, the outside of which is in fluid communication with reservoir 24. A suitable compression spring 103 urges the bellows 102 to the right. Link 100 would remain in the position shown under the urge of spring 104 when the unit is not in operation and in either position 105 or 106 when in operation, one position corresponding to a forward direction of turbine rotation and the other to a reverse direction of rotation. Assuming that the turbine blades are open to effect forward rotation and that link 100 is in the position shown at 105, an increase in liquid pressure on bellows 102 corresponding to a sudden pulsation would rotate bell crank 97 clockwise, which through link 96 and bell crank 94 would move control collar 82 toward its neutral or off position. This would reduce the turbine blade pitch, restrict liquid flow through the turbine and hence prevent the sudden increase in liquid pressure from effecting the smooth flow of power from shaft 27. Conversely, if the turbine is operating in reverse, link 100 would be positioned as shown at 106, and collar 82 would be positioned to reverse the blades as previously described. An increase in pressure on bellows 102 would move bell crank 97 counterclockwise and through link 96 and bell crank 94 again force collar 82 toward its neutral or off position thus compensating for the fluctuation as described for forward operation. It is apparent that while the foregoing has been described for an increase in pressure in reservoir 24, a decrease in pressure would cause the opposite effect, that is, a decrease would tend to open the turbine blades for momentary delivery of more liquid therethrough. To place link 100 in position 105 or 106, a pair of solenoids 107 and 108 are provided which are connected to suitable switches 109 and 110 on control quadrant 92. When lever 91 is initially moved from its off position to either forward or reverse, it completes a circuit to one or the other of solenoids 107 or 108, positioning link 100 in either position 105 or 106. Further movement of lever 91 will determine the turbine blade pitch and hence the power delivered by the turbine. When lever 91 is moved to its off position, it opens the circuit to either solenoid 107 or 108, and spring 104 instantly returns link 100 to the position shown. Thus, if an explosion should occur in cylinder 11 after the solenoid circuits are broken, the increase of liquid pressure resulting therefrom would not effect change of turbine blade pitch since link 100 would previously have been moved to an inoperative position by spring 104. If for any reason it is desired to render the positioning means inoperative, switch 111 may be left open. Also, when the arrangement for damping fluctuation is not employed, lever 91 may be the sole control, pivot 95 in this case being a fixed pivot and the remainder of the linkage connected thereto eliminated.

In Fig. 1 bell crank 21 is illustrated as a simple lever pivoted intermediate its ends to promote clearness to the drawings. It is contemplated, however, that the lever 21 of Fig. 1 and its associated linkage may take the form as shown in Figs. 4 and 5 in which corresponding parts are indicated by primed reference characters. Bell crank 21' is slotted at 70 to receive a pin 71 which is slidable therein and also in another slot 72 in frame member 73. Link 74 connects pin 71 to pin 75 on connecting rod 20'. Connecting rod 20' is pivotally connected to bell crank 21' by pin 76. From Fig. 5 it can be seen that as piston rod 23 moves outwardly on the power stroke of piston 12, pin 71 slides in slots 70 and 72 changing the mechanical advantage of the lever arm of 21 in favor of piston 12. Despite the decreasing pressures resulting from the expanding gases, this permits piston 12 to overcome the resistance of pump piston 18 which operates against substantially constant back pressure. It is thus possible to carry expansion in cylinder 11 to a point where optimum thermal efficiency may be obtained despite the constant resisting force against pump piston 18, thus increasing the overall efficiency of the entire power plant. It is to be observed, also, that on the compression stroke of piston 12 the mechanical advantage constantly increases in favor of the connecting rod 20' which is operated by plunger 35, and hence the increasing pressures of compression can be overcome thereby. In operation of the foregoing arrangement, the amount of fuel metered to the combustion chamber may be so regulated that the pressure of the expanding gases in the cylinder at any point of the expansion stroke will be just sufficient to overcome the back pressure exerted on pump piston 18 by the liquid in reservoir 24. The engine in this case would operate on a substantially true otto cycle. If it is desired to increase the power output per stroke of piston 12, still retaining operation on a substantially true otto cycle, the pressure in tank 32 may be increased, effecting a higher back pressure against which piston 18 must operate and increasing the amount of fuel delivered to the cylinder 12 per stroke to provide increased combustion and expansion pressures to overcome the higher back pressure on piston 18.

Figure 8:
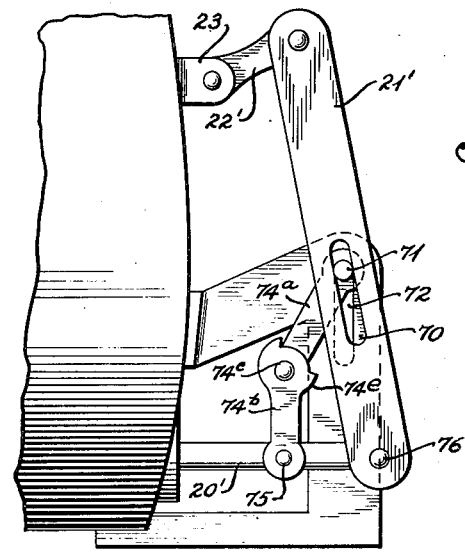
Fig. 8 is a view similar to Fig. 7 showing the linkage in another position.

Figs. 7 and 8 show an alternate form of the linkage shown in Figs. 4 and 5, this modification permitting operation of the engine on a modified otto cycle. The linkage is all identical to that of Figs. 4 and 5 except that link 74 is constructed in two parts 74a and 74b, connected by pivotal connection 74c, the two parts having limited pivotal movement between stops 74d and 74e. This latter linkage permits a delayed or lost motion connection between piston 12 and the fulcrum changing mechanism, that is, piston 12 may move part way out on its expansion stroke without changing the mechanical advantage in its favor but after reaching a predetermined point the fulcrum changing mechanism becomes operative, and the leverage increases in favor of piston 12 for the remainder of the stroke. Fig. 7 illustrates the position of the parts at the beginning of the expansion stroke with links 74a and 74b in one relationship, the distance between pins 75 and 71 being at a minimum. Fig. 8 illustrates the position of links 74a and 74b at the point corresponding to a predetermined position of piston 12 where the leverage in favor of piston 12 has commenced. Links 74a and 74b are now in their extended position with the distance between pins 75 and 71 at a maximum. Further movement of piston 12 on its expansion stroke will move pin 71 downwardly in slot 72 effecting an increase in leverage in favor of piston 12 in the same manner as described for the linkage of Figs. 4 and 5. With this arrangement, it is possible to modify the true otto cycle slightly which is effected as follows: Assuming that the pump piston 18 is operating against the same back pressure as the modification of Figs. 4 and 5 and a larger amount of fuel is introduced into the power cylinder by opening the carburetor throttle valve, then the compression pressure would be higher and hence the peak pressure following ignition would tend to rise beyond that of the embodiment of Figs. 4 and 5. Since this pressure would be in excess of that required to overcome the resistance of pump piston 18 and since piston 12 is a free piston, the movement of which is determined by the difference between the forces of combustion and the resisting forces, it will tend to move outwardly so that the peak pressure above referred to would not be reached. The initial part of the expansion stroke would therefore approach a constant pressure curve, that is, a line parallel to the volume line on a pressure-volume indicator card. This pressure being constant, no increase in leverage in favor of piston 12 would be necessary until the pressure began to fall. At this point, the linkage 74a, and 74b would have reached a point where the leverage in favor of piston 12 would commence and as the expansion pressures decrease on a curve simulating the expansion curve of an otto cycle, the decreasing pressures would still be capable of overcoming the resistance of pump piston 18. It will be observed also that on the compression stroke, initial outward movement of pump piston 18 will first move links 74a, 74b to their relative position as shown in Fig. 7; further movement will then move pin 71 upwardly in slot 72 increasing the lever arm in favor of pump piston 18 so that as piston 12 approaches the end of its compression stroke, sufficient force is available to overcome the compression pressure.

In event that reservoir 24 is filled to capacity this would preclude starting of the system, whereas if no high pressure liquid remains in reservoir 24, starting may be effected by auxiliary pump 77 which will transfer liquid from reservoir 25 to reservoir 24 and thus establish sufficient reserve energy in reservoir 24 to start the device in the normal manner previously described. It is apparent that the drive means for such pump may take any suitable form consistant with the requirements of the system as a whole. One example would be an electric motor.

The various parts of the device would, in perhaps most cases, be so designed and proportioned relative to one another to give optimum overall efficiency and in this connection, it should be observed that if a certain air pressure in tank 32 is chosen and also a fixed throttle setting in the carburetor, the engine will always operate on substantially the same thermodynamic cycle, and variations in power requirements of the turbine will change only the rate of such cycle; that is, for example, an increase in power requirements automatically effects more power strokes per unit of time by the engine, but its actual thermodynamic cycle remains substantially unchanged. The conventional engine, on the other hand, varies its thermodynamic cycle under change of load, and usually at full load the cycle is least efficient thermally. The advantages of this type of engine therefore become readily apparent since in this invention an optimum efficient thermodynamic cycle can be chosen which will remain the same under variation of load.

In some cases it may be desired to change the potential power output of the system, either by loading it over a designed optimum load or decreasing its loading from a designed optimum loading. The thermodynamic cycle attendent with such changes can be chosen in a simple manner by this invention. If a higher output is desired, for example, a greater air pressure is employed in air tank 32 by admitting air through valve 78. This, in turn, calls for a higher output by piston 12 so the carburetor throttle is merely opened in accordance with the increased power requirements. Similarly, if it is desired to reduce the potential power output, the air pressure is decreased and the throttle valve closed somewhat from its normal designed position.

While the previous description sets forth the expedience of the invention as a means to obtain uniform power from an intermittent power source, and especially one having a minimum number of working cylinders, it is to be observed that the device has equal application to installations where intermittent power is desired. The reserve energy in reservoir 24 is instantly available for requirements of the turbine whether they be continuous, variable, or intermittent power, it only being necessary to adjust the turbine blades in accordance with the power needs of shaft 27, and the remainder of the system automatically supplies these requirements.

It is apparent that while several specific embodiments of the invention have been described, this is intended only for purposes of teaching the principles of the invention rather than as a limitation thereon. The engine, for example, has been described as a two-cycle, air-cooled otto type, but it is apparent that it could be liquid cooled or operated on other cycles such as the diesel cycle wherein a fuel injector would be substituted for a spark plug and ignition would take place as a result of the heat of compression. Steam or other gases could also be employed as the expansible medium if so desired, the only requirement being that suitable valves would be incorporated to control entry and exhaust of the gas. The expandable bellows for effecting variable volume of the reservoirs could be in the form of pistons slidable in cylinders against the urge of suitable springs, and the turbine is subject to wide variations in its form. The various components, while illustrated in compact arrangement could be located in other suitable relationships depending on the installation requirements of the power plant. Similarly, the starting mechanism could be controlled by sundry means such as solenoid operated valves as will become apparent once the broad teachings of the invention are understood.

Further, the device, while disclosed as a system in which power is delivered to a shaft, could well function as a pumping device by merely eliminating the turbine and incorporating the remainder of the device in a fluid system which requires for its operation the movement of a liquid at a continuous rate, a variable rate, or an intermittent rate in either a closed or open circuit. Thus, as a pump means in a closed circuit, the invention could be employed with any device which requires for its operation a flow of liquid under differential pressure; in an open circuit, it could receive liquid from any source of supply and deliver a column of liquid to effect useful work. As an example of the latter, the invention could be employed for hydropropulsion.

It is accordingly intended that the claims to follow should be construed in terms of the broad teachings above set forth and not as limited to the exact embodiments illustrated.

The invention described herein may be manufactured and used by or for the Government of the United States of America for governmental purposes without the payment of any royalties thereon or therefor.

What is claimed is:

1. A mechanical linkage comprising: a lever having one end to which a varying force may be applied and another end to which a substantially constant force may be applied, a shiftable pivot intermediate the two ends aforesaid, and means for shifting said pivot to vary the mechanical advantage of the first end as the force thereon decreases, said mechanical linkage including pin, a slot extending axially of said lever, a support having a slot extending substantially in the average direction of said lever, said pin being mutually slidable in both slots to form said shiftable pivot, a constant force applying reciprocating rod connected to said other end of the lever, and a link pivotally connected to said rod and to said pivot pin for shifting said pivot.

2. A mechanical linkage as defined in claim 1, wherein said link is a toggle link pivoted between its ends and having stop means to prevent its two portions to fully line up their pivots and thereby provide a lost motion effect in shifting said pivot during a portion of reciprocation.

3. A mechanical linkage comprising: a lever having a first end movable between substantially predetermined limits and to which a varying force may be applied and a second end to which a constant force may be applied, a shiftable pivot intermediate the two ends aforesaid, means for retaining said pivot in substantially the same position relative to said ends for a portion of the movement between said limits, and means operable thereafter for shifting said pivot to increase the mechanical advantage of said first end with respect to said second end, said pivot retaining and shifting means comprising a lost motion linkage moveable in response to movement of the lever.

4. A mechanical linkage mechanism comprising a slotted lever, a shiftable pivot engaging the slot in said lever, means for applying a force to the lever to rotate it in one direction about the pivot, a second means for applying a force acting in the opposite direction when the movement produced by said latter force exceeds that produced by the first said force, and means fixed to and moveable with one of the said force applying means for shifting the pivot as the lever moves backwardly and forwardly under the action of the force applying means.

5. A mechanical linkage mechanism comprising a slotted lever, a shiftable pivot engaging the slotted portion in said lever, means for applying a varying decreasing force to the lever to rotate it in one direction about the pivot, means for applying an approximately constant force to the lever to rotate it in the opposite direction and means for shifting the pivot to vary the mechanical advantage of the varying decreasing force as such force decreases during rotation, said means for shifting being operatively connected to one of said force applying means and actuated by movement thereof.

6. A mechanical linkage mechanism comprising a grooved lever, a shiftable pivot engaging the groove portion in said lever, means for applying a varying decreasing force to the lever to rotate it in one direction about the pivot, means for applying an approximately constant force to the lever to rotate it in the opposite direction and means fixed to one of said force applying means for shifting the pivot to vary the mechanical advantage of the varying decreasing force as said force decreases during rotation of the lever.

7. The combination of claim 6 further defined in that the force applying means are connected to the lever on opposite sides of the pivot and the pivot shifting means is a moveable link.

COOPER BUCK BRIGHT.

REFERENCES CITED

The following references are of record in the file of this patent:

UNITED STATES PATENTS

| Number | Name | Date |
| --- | --- | --- |
| 418,877 | Salisbury | Jan. 7, 1890 |
| 2,305,070 | Butler et al. | Dec. 15, 1942 |